US012565442B2

(12) United States Patent
Kashiwagi

(10) Patent No.: US 12,565,442 B2
(45) Date of Patent: Mar. 3, 2026

(54) MANUFACTURING METHOD OF GLASS BASE MATERIAL FOR OPTICAL FIBER

(71) Applicant: Shin-Etsu Chemical Co., Ltd., Tokyo (JP)

(72) Inventor: Yusuke Kashiwagi, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 200 days.

(21) Appl. No.: 18/374,763

(22) Filed: Sep. 29, 2023

(65) Prior Publication Data

US 2024/0140853 A1     May 2, 2024

(30) Foreign Application Priority Data

Oct. 28, 2022    (JP) ................................. 2022-173366

(51) Int. Cl.
*C03B 37/014* (2006.01)
(52) U.S. Cl.
CPC .... *C03B 37/01446* (2013.01); *C03B 2201/20* (2013.01)
(58) Field of Classification Search
None
See application file for complete search history.

(56) References Cited

U.S. PATENT DOCUMENTS

2003/0000255 A1    1/2003  Kohmura et al.
2018/0265395 A1*   9/2018  Cocchini ........... C03B 37/01493

FOREIGN PATENT DOCUMENTS

CN        108129017 A  *  6/2018  ......... C03B 37/0146
JP        2003-81657 A     3/2003

OTHER PUBLICATIONS

CN108129017A EPO Machine Translation retrieved Jun. 10, 2025. (Year: 2025).*

* cited by examiner

*Primary Examiner* — Lisa L Herring
(74) *Attorney, Agent, or Firm* — Greenblum & Bernstein, P.L.C.

(57) ABSTRACT
A manufacturing method of glass base material for optical fiber in which occurrence of opaque glass portion and elongation can be suppressed is provided. A preparation step of porous base material for optical fiber in which a porous glass layer is formed around the periphery of a core rod; a sintering preparation step, in which the porous base material for optical fiber is hung in a furnace core tube of a sintering apparatus; and a sintering step in which a mixture of halogen-containing gas and inert gas is flowing into the furnace core tube and the porous base material for optical fiber is made into transparent glass by heating the porous base material for optical fiber while moving the heater relative to the porous base material for optical fiber from one end of the core rod to the other end, to obtain glass base material for optical fiber, are performed.

6 Claims, 6 Drawing Sheets

S1 — Prepare a porous base material

S2 — Hang the porous base material in a furnace core tube

S3 — Dehydrate and sinter the porous base material
to manufacture a glass base material for optical fiber (a)

(b)

| | Example 1 | Example 2 | Example 3 | Example 4 | Comparative Example 1 | Comparative Example 2 | Comparative Example 3 |
|---|---|---|---|---|---|---|---|
| Length H | 0.08L | 0.17L | 0.20L | 0.26L | 0 | 0.03L | 0.39L |
| Chlorine concentration C1 | $0.48C_0$ | $0.43C_0$ | $0.37C_0$ | $0.26C_0$ | $C_0$ | $0.87C_0$ | $0.15C_0$ |
| Opaque glass portion | None | None | None | None | Existing | Existing | Existing |
| Transmission loss (dB/km) | 0.28 | 0.28 | 0.29 | 0.30 | 0.28 | 0.28 | 0.34 |
| Outer diameter (mm) | 153 | 156 | 161 | 163 | 145 | 147 | 167 |

MANUFACTURING METHOD OF GLASS BASE MATERIAL FOR OPTICAL FIBER

CROSS-REFERENCE TO RELATED APPLICATION

This non-provisional application claims priority under 35 U.S.C. § 119(a) from Japanese Patent Application No. 2022-173366, filed on Oct. 28, 2022, the entire contents of which are incorporated herein by reference.

BACKGROUND

Technical Field

The present invention relates to a manufacturing method of glass base material for optical fiber, in which a porous base material for optical fiber is dehydrated and sintered to form glass base material for optical fiber.

Background Art

A glass base material for optical fiber is produced by dehydrating and sintering a porous base material for optical fiber, which is produced by depositing glass fine particles on seed rods or other materials, to make transparent glass. Typical manufacturing methods for the porous base material for optical fiber include VAD, MCVD, and OVD methods. These manufacturing methods can be employed in a combined manner based on the advantages of each. For example, the porous base material for optical fiber may be manufactured by manufacturing a seed rod containing part of the core and cladding by the VAD method and forming the remaining part of the cladding on the periphery of the manufactured seed rod by the OVD method.

JP2003-81657A describes a method for manufacturing a porous base material for optical fiber by depositing glass particles, which will become the cladding portion, on the periphery of a seed rod containing a core by the OVD method, and dehydrating and sintering the manufactured porous base material for optical fiber by hanging and heating it in a sintering apparatus to manufacture the glass base material for optical fiber.

Portions of insufficiently transparent vitrification may remain inside the glass base material for optical fibers produced in this way. To address this problem, it is considered to increase the heating temperature in the sintering apparatus in order to promote transparent vitrification. However, if the heating temperature is raised excessively, softening occurs due to heating, and the portion of the base material that has undergone transparent vitrification will be elongated by the load due to the weight of the portion therebelow. As a result, the glass base material for optical fiber may be longer than the porous base material for optical fiber before sintering, or the diameter may differ between the upper and lower end of the base material, which may cause problems such as inability to remove the base material from the sintering apparatus, damage to the sintering apparatus, or failure to obtain desired properties.

In JP2003-81657A, as a solution to such problems, a combination of several methods is disclosed: as the heating position moves from the bottom end to the top end of the base material, (1) decreasing the vitrification temperature; (2) decreasing the speed of movement of the heating position; and (3) decreasing the helium gas flow rate.

SUMMARY OF THE INVENTION

Problems to be Solved by the Invention

The problem-solving method of JP2003-81657A is a complex one that combines three parameters—vitrification temperature, heating position movement speed, and gas flow rate—for optimization, and it is difficult to optimize and manage these parameters for each of the many sintering apparatuses installed in a plant, adapting them to characteristics of each apparatus.

The purpose of the present invention is to provide a manufacturing method of glass base material for optical fiber in which the occurrence of opaque glass portion and elongation can be suppressed by a simple adjustment of sintering parameters.

Means for Solving the Problems

The manufacturing method of glass base material for optical fiber according to the present invention performs: a preparation step of porous base material for optical fiber in which a porous glass layer is formed around the periphery of a core rod; a sintering preparation step, in which the porous base material for optical fiber is hung in a furnace core tube; and a sintering step in which a mixture of halogen-containing gas and inert gas is constantly flowing into the furnace core tube and the porous base material for optical fiber is made into transparent glass by heating the porous base material for optical fiber while moving the heater relative to the porous base material for optical fiber from one end of the core rod to the other end, to obtain the glass base material for optical fiber, wherein in the process of moving the heater relative to the porous base material for optical fiber in the sintering step, the concentration of halogen-containing gas in the mixed gas is reduced.

When the concentration of the halogen-containing gas at the start of the execution of the sintering step is $C_0$ and the concentration of the halogen-containing gas at the time when the other end of the core rod passes the vertical midpoint of the heater is $C_1$, the relationship between $C_0$ and $C_1$ may be $0.25 \times C_0 \leq C_1 \leq 0.5 \times C_0$.

When the length of the core rod is L, and the distance from the other end of the core rod to the position on the core rod where the halogen-containing gas concentration begins to decrease is H, the relationship between L and H may be $0.05 \times L \leq H \leq 0.30$ L.

When hanging the porous base material for optical fiber, one end of the porous base material for optical fiber may be the lower end, and the other end may be the upper end.

The heating temperature by the heater may be 1400 to 1650° C.

The halogen-containing gas may be chlorine or silicon tetrachloride.

The inert gas may be helium, nitrogen or argon.

Effects of Invention

According to the manufacturing method of glass base material for optical fiber, it is possible to suppress the occurrence of opaque glass portion and elongation by adjusting sintering parameters in a simple manner.

DESCRIPTION OF EMBODIMENTS

Figure 1:
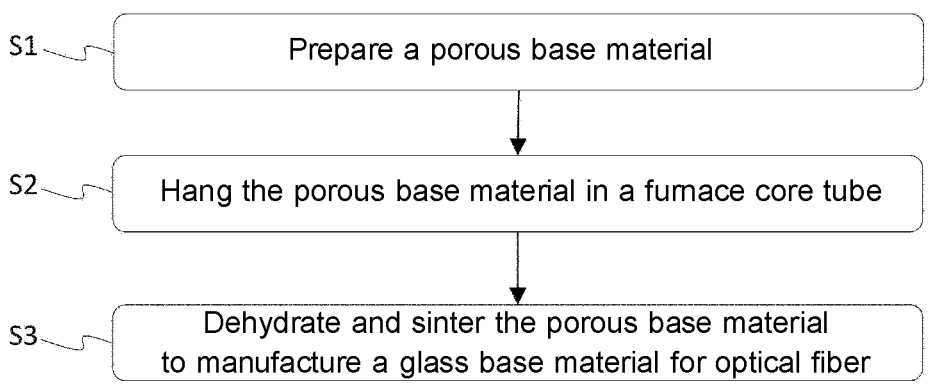
FIG. 1 illustrates a flow of the manufacturing method of glass base material for optical fiber.

In the following, an embodiment of the present invention is described with reference to the drawings. In the following descriptions and drawings, the same portion will be marked with the same reference numerals, and the description of the portion once described will be omitted or described only to the extent necessary.

FIG. 1 illustrates a flow of the manufacturing method of glass base material for optical fiber.

First, a porous base material for optical fiber in which a porous glass layer is formed around the periphery of a core rod is prepared (porous base material preparation step S1).

Figure 2:
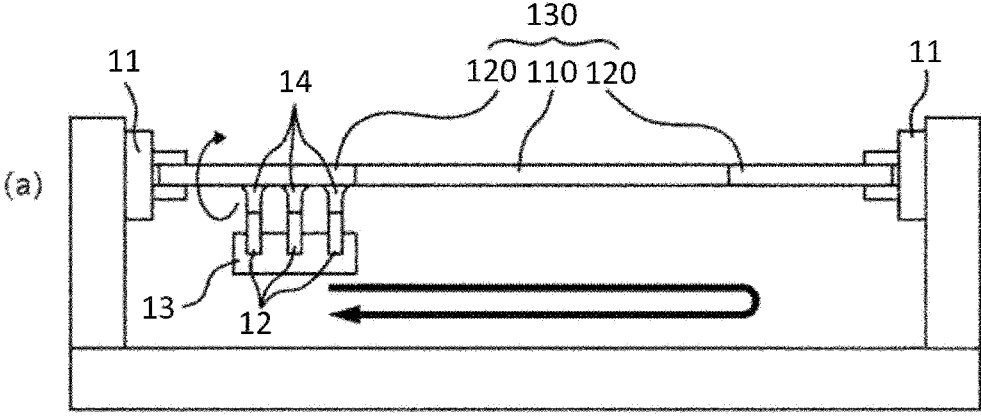
FIG. 2 illustrates an example of how to prepare the porous base material 100 for optical fiber using the OVD method.
Figure 2:
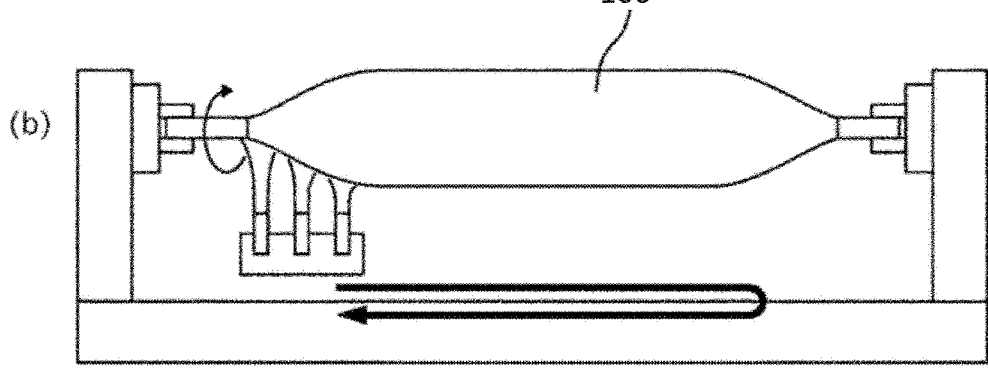

An example of how to prepare the porous base material 100 for optical fiber using the OVD method is explained in FIG. 2(*a*).

First, the core rod 110, which will be the core of the optical fiber, is prepared. The core rod 110 may include a core material as well as a portion of a cladding material.

A glass handle 120 is welded to each end of the core rod 110, and its ends are gripped by the rotating chuck 11 as the target rod 130. If there are no manufacturing problems, a handle 120 may be welded to only one end of the core rod 110 to form the target rod 130, and only that end may be gripped by the rotating chuck 11.

A burner 12 is fixed to a burner stand 13, which is driven in the direction of extension of the target rod 130 and in the back and forth direction toward the target rod 130. A glass raw material such as silicon tetrachloride, trichloro(methyl) silane, octamethylcyclotetrasiloxane, and oxygen and hydrogen are supplied to the burner 12 to produce a flame hydrolysis reaction in flame 14, resulting in the formation of glass particles as the cladding material.

The glass particles thus generated and released from burner 12 are deposited on the periphery of target rod 130, which rotates about its axis with the rotation of rotating chuck 11, while the burner stand 13 is reciprocated along the target rod 130, to form a porous glass layer. As the porous glass layer becomes thicker due to the deposition of glass particles, the burner stand 13 is moved back, and when the desired thickness is obtained, the supply of the glass raw material and oxygen and hydrogen to the burner 12 is stopped. In this way, a porous base material 100 for optical fiber shown in FIG. 2(*b*) can be produced, in which a porous glass layer of the desired thickness is formed around the periphery of the core rod 110. By depositing the glass particles not only on the periphery of the core rod 110, but also on the periphery of the portion of the handle 120 near the core rod 110, more optical fibers can be obtained.

Then, the prepared porous base material 100 for optical fiber is hung in the furnace core tube 24 of the sintering apparatus 20 (sintering preparation step S2).

Figure 3:
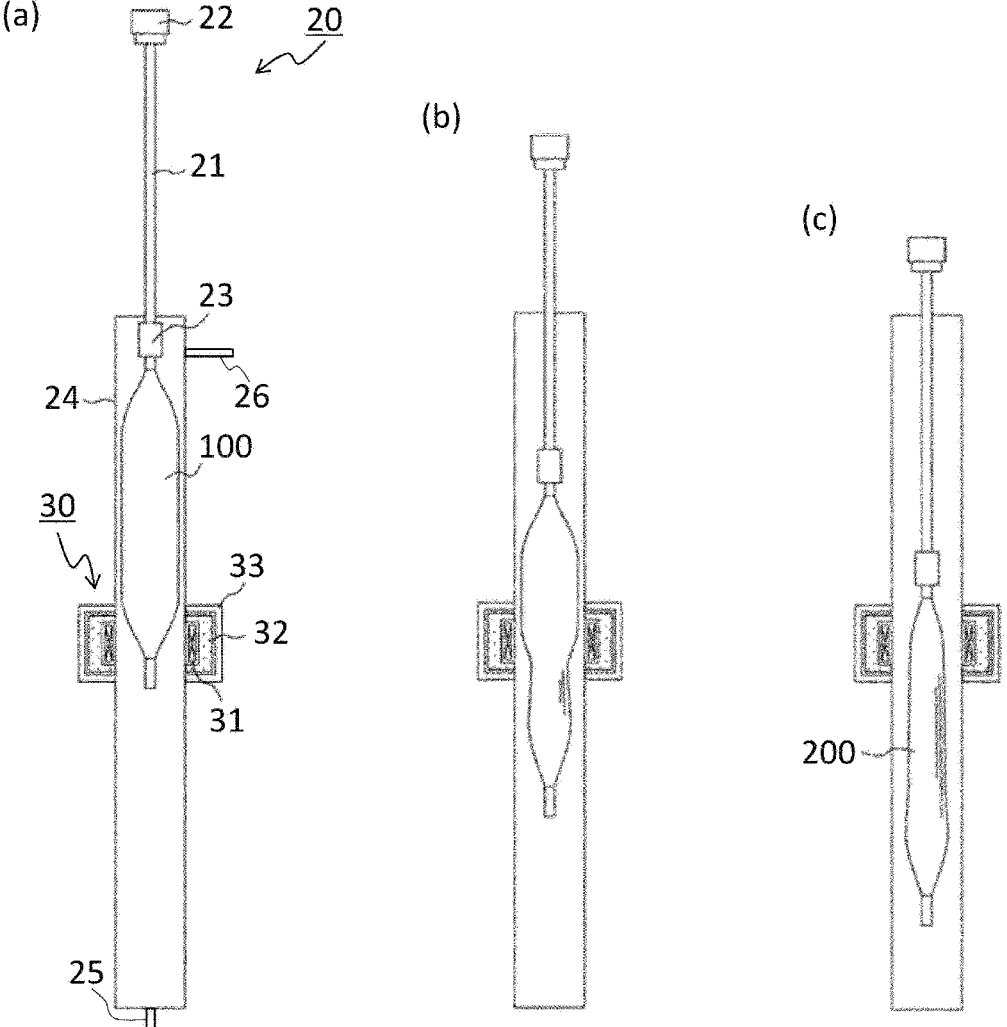
FIG. 3 illustrates an example of a method for sintering the porous base material 100 for optical fiber.

As shown in FIG. 3(*a*), the sintering apparatus 20 has a shaft 21 suspended on a carriage mechanism 22 at one end, the carriage mechanism 22 that drives the shaft 21 vertically up and down while rotating it about an axis, a connecting member 23 that connects either end of the porous base metal 100 for optical fiber to the other end of the shaft 21, the furnace core tube 24, which is made of quartz and acts as a reaction vessel, and the heating furnace 30, which is fixed to the outer circumference of the furnace core tube 24. The heating furnace 30 is equipped with a heater 31 that generates heat and heats the porous base material 100 for optical fiber, a heat-insulation material 32 that prevents the heat generated by the heater 31 from leaking outside, and a chamber 33 that is housing.

The porous base material 100 for optical fiber is driven by the carriage mechanism 22, inserted into the furnace core tube 24 from above, and lowered to the position before heating is started. After insertion of the porous base material 100 for optical fiber, the upper opening of the furnace core tube 24 is sealed with a lid or the like.

When the handle 120 is welded to only one end of the core rod 110, the said one end of the porous base material 100 for optical fiber is connected to the connecting member 23.

Then a mixture of halogen-containing gas and inert gas is constantly flowing into the furnace core tube 24 from the gas inlet port 25 at the bottom of the furnace core tube 24, and the porous base material 100 for optical fiber is made into transparent glass by heating the porous base material 100 for optical fiber while moving the heater 31 relative to the porous base material 100 for optical fiber from one end of the core rod 110 to the other end. Thereby, a glass base material 200 for optical fiber with a cladding region formed around the periphery of the core rod 110 is produced (sintering step S3).

For the halogen-containing gas, chlorine or silicon tetrachloride are suitable. For the inert gas, nitrogen, argon or helium, for example, are suitable. The inside of the furnace core tube 24 is maintained at a constant pressure, and if the pressure becomes excessive, excess gas is discharged from the gas discharge port 26.

The porous base material 100 for optical fiber, which is hung in the furnace core tube 24, is lowered while being rotated by the carriage mechanism 22, and is successively heated by the heater 31 from one end of the core rod 110, the lower end, to the other end, the upper end, that is, from the lower end to the upper end of the porous base material 100 for optical fiber, at 1400 to 1650° C. to simultaneously dehydrate and sinter the porous base material to make it transparent glass (FIG. 3(*b*)). Thereby, the glass base material 200 for optical fiber can be obtained (FIG. 3(*c*)).

Dehydration and sintering may be performed separately. For example, first, the porous base material 100 for optical fiber is heated by heater 31 to 1000-1200° C. successively from the lower end to the upper end while being rotated and lowered by the carriage mechanism 22, and only dehydration is performed. Then, after the porous base material 100 for optical fiber is raised by the carriage mechanism 22, it is lowered while being rotated again, and heated by heater 31 to 1400 to 1650° C. successively from the bottom end to the top end to sinter and make the base material transparent glass.

The porous base material 100 for optical fiber is set below the heating furnace 30, and while being raised while being rotated by the carriage mechanism 22, the porous base material 100 for optical fiber may be dehydrated and sintered to become transparent glass by successively heating the core rod 110 from one end, the top side, to the other end, the bottom side, i.e., from the top end of the porous base material 100 for optical fiber to the bottom end, by heater 31.

Relative movement of the heater 31 may be achieved by moving the heater 31 relative to the fixed porous base material 100 for optical fiber.

Figure 4:
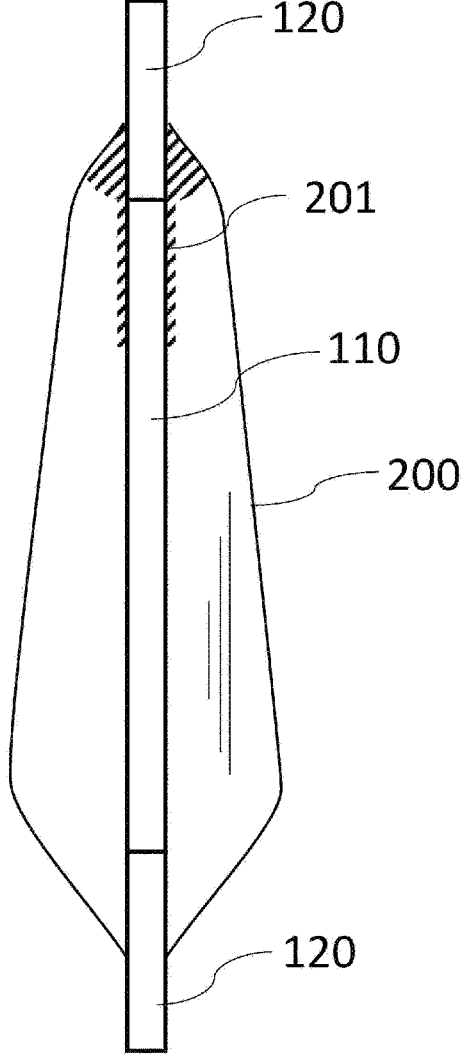
FIG. 4 illustrates how opaque glass portion 201 remains in the glass base material 200 for optical fiber.

Inside the glass base material 200 for optical fiber produced simply by the above method, an opaque glass portion 201 may remain near the tip of the core rod 110 on the side where the transparent vitrification is last completed. When transparent vitrification is performed from the bottom end to the top end of the porous base material 100 for optical fiber, the opaque glass portion 201 will remain near the top end of the core rod 110 in the glass base material 200 for optical fiber, as shown in FIG. 4. The opaque glass portion 201 tend to remain, especially at the boundary between the core rod 110 and the cladding region.

The opaque glass portion 201 may induce unexpected fiber breakage or outer diameter fluctuations when the glass base material 200 for optical fiber is spun to form an optical fiber.

Figure 5:
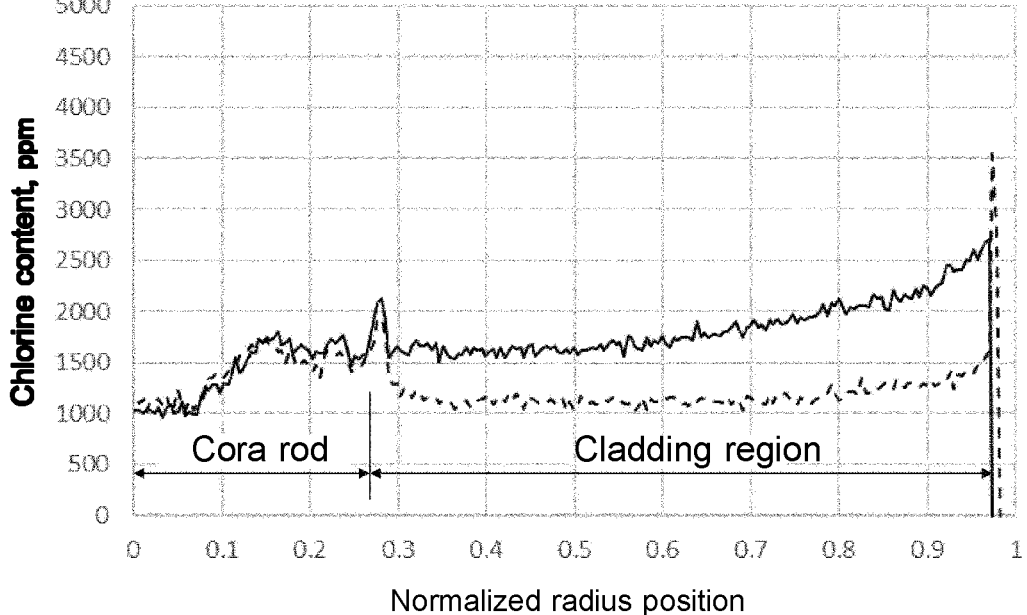
FIG. 5 illustrates the distribution of chlorine content in the glass base material 200 for optical fiber.

FIG. 5 shows the results of measuring the chlorine content in glass from the center (normalized radius position=0) to the outer edge (normalized radius position=1) of the portion near the top of the core rod 110, where the opaque glass portion 201 remains, and the portion near the vertical midpoint of the core rod 110, cut into cylindrical shapes from the same glass base material 200 for optical fiber, respectively. The solid line shows the measurement result of the area near the top, and the dashed line shows the measurement result of the area near the midpoint in the vertical direction. The measurement results show that in the central region, which is the core rod 110, there is no significant difference in chlorine content, while in the cladding region formed around the core rod 110 by the OVD method, the chlorine content in the area near the top end is higher than that in the area near the midpoint in the vertical direction.

Based on this measurement result, a thorough study confirmed that the lower the chlorine content in the glass, the less likely opaque glass portion 201 is to form. This is thought to be because as the chlorine content in the glass increases, chlorine gas molecules remain in the glass as gas molecules instead of being solidly dissolved into the glass as chlorine atoms, forming opaque glass portion 201.

On the other hand, the addition of dopants other than silicon dioxide, such as chlorine, to the glass tends to decrease viscosity. When transparent vitrification proceeds while moving heater 31 relative to the porous base material 100 for optical fiber from the bottom end to the top end, as the heated area moves, the transparent vitrified area below the heated area increases. Due to this, the load applied to the heated portion increases as the heating position moves toward the upper end, and the degree to which the heated portion is stretched also increases. As a result, the outer diameter of the glass matrix 200 for optical fiber is smaller at the top end than at the bottom end, as shown in FIG. 3.

Therefore, with regard to this problem, by reducing the chlorine content in the glass, it is possible to suppress the decrease in viscosity of the glass and make it difficult to stretch when making transparent glass, thereby reducing the difference in outer diameter between the upper end and lower end of the glass base material 200 for optical fiber.

Accordingly, in the present invention, in the sintering step S3, the chlorine content in the glass base material 200 for optical fiber is reduced by the following method to suppress the generation of the opaque glass portion 201 and the difference in outer diameter between the upper end and lower end.

Figure 6:
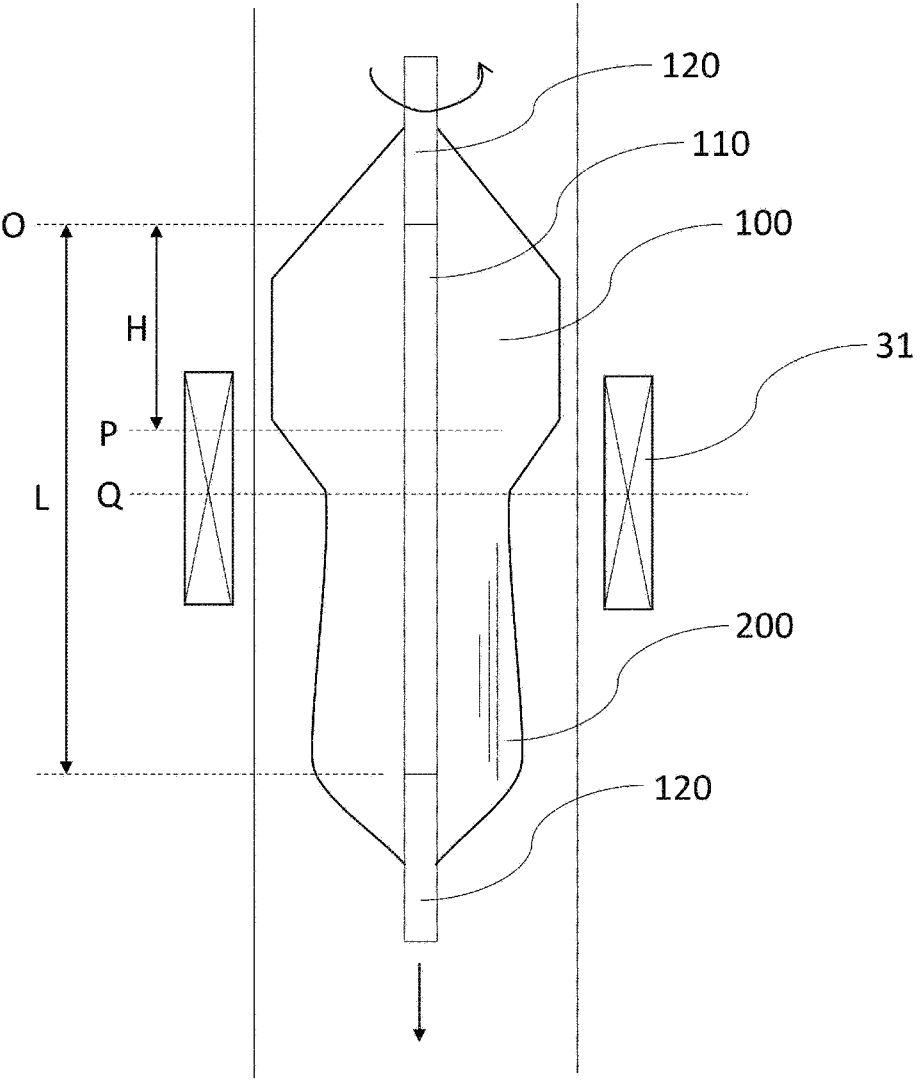
FIG. 6 illustrates the method of sintering the porous base material 100 for optical fiber applied in the present invention.

FIG. 6 shows the progress of transparent vitrification by sequentially moving the heater 31 from the bottom end to the top end of the porous base material 100 for optical fiber while lowering the porous base material 100 for optical fiber. In FIG. 6, the area below heater 31 has already been transparently vitrified, while the area above the heater 31 is the porous base material for optical fiber before transparent vitrification.

With the porous base material 100 for optical fiber hanging down in the furnace core tube 24 of the sintering apparatus 20, the position of the upper end of the core rod 110 is at point O, the position of the core rod 110 vertically downward from point O by a distance H is at point P, and the vertical midpoint of the heater 31 is at point Q. In other words, the point Q does not move because the heater 31 is fixed, while the points P and 0 move vertically downward as the porous base material for optical fiber 100 is lowered, with the point P passing the point Q first, followed by the point O passing the point Q.

In the present invention, the concentration of halogen-containing gas in the mixed gas is reduced in the process of moving the heater 31 relative to the porous base material 100 for optical fiber in order to reduce the chlorine content in the glass base material 200 for optical fiber.

Figures 7, 8:
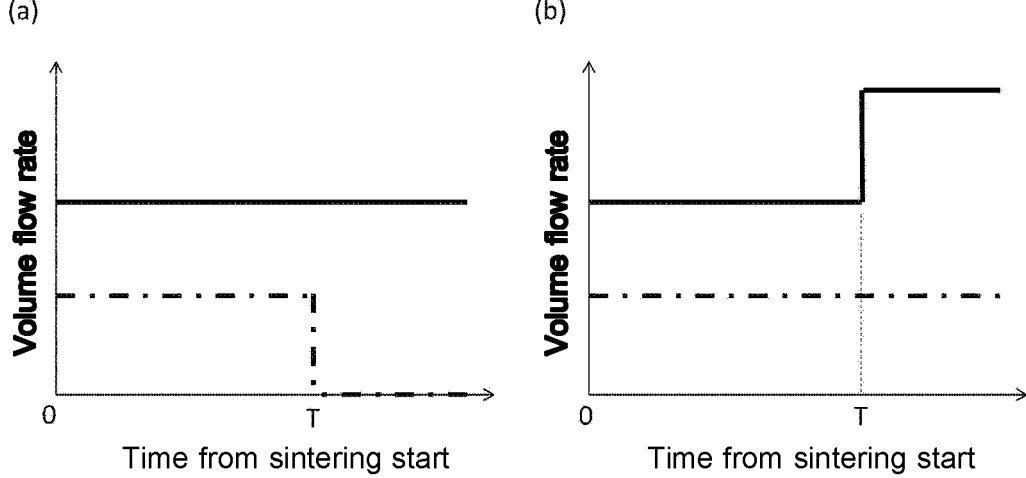
FIG. 7 illustrates the method of relatively decreasing the volume flow rate of halogen-containing gas.
FIG. 8 illustrates the results of the examples.

For example, the concentration of halogen-containing gas in the mixed gas can be reduced by decreasing the volume flow rate of the halogen-containing gas in the furnace core tube 24 relative to the volume flow rate of the inert gas when the porous base material 100 for optical fiber descends, and the point P passes the point Q. Two methods of relatively decreasing the volume flow rate of halogen-containing gas are explained using FIG. 7. In FIG. 7, the time variation of the volume flow rate of the inert gas from the start of sintering is shown as a solid line, and the time variation of the volume flow rate of the halogen-containing gas from the start of sintering is shown as a chain line. FIG. 7($a$) illustrates the first method. In this method, the volume flow rate of the halogen-containing gas is set to 0 immediately after the time T when point P passes point Q. The volume flow rate of the halogen-containing gas need not be zero but can be decreased with a gradient with respect to time. FIG. 7($b$) illustrates the second method. In this method, the volume flow rate of the inert gas is increased immediately after the time T when point P passes point Q. The volume flow rate of the inert gas need not be increased in a step-like manner but can be increased with a gradient with respect to time. Either method can be used to achieve the same effect, but since an increase in the volume flow rate of the inert gas increases the cost, the method of decreasing the volume flow rate of the halogen-containing gas relative to the volume flow rate of the inert gas is preferable.

For example, when the concentration of halogen-containing gas before point P passes point Q is $C_0$ and the concentration of halogen-containing gas at the time point O passes point Q is $C_1$, the concentration of the halogen-containing gas may specifically be decreased so that the relationship between $C_0$ and $C_1$ satisfies $0.25 \times C_0 \leq C_1 \leq 0.5 \times C_0$.

For example, when the length of the core rod 110 is L, the distance H may be determined so that the relationship between the length L and the distance H from point P to O point satisfies $0.05 \times L \leq H \leq 0.30$ L.

It is desirable to determine the concentration of halogen-containing gas $C_1$ and the distance H from point P to point O is determined so that the transmission loss at the wavelength of 1383 nm is 0.31 dB/km or less in the optical fiber obtained by spinning the glass base material for optical fiber produced by the manufacturing method of the glass base material for optical fiber in the invention near the O point.

According to the manufacturing method of glass base material for optical fiber in the present invention described above, the chlorine content in the glass base material for optical fiber can be reduced by simple adjustment of sintering parameters, for example, reducing the volume flow rate of chlorine gas to 0 immediately after the P point passes the Q point. Thereby, the occurrence of opaque glass portions and the difference in outer diameters between the upper and lower ends due to the elongation of the upper end can be easily suppressed.

EXAMPLES

Examples of the present invention and comparative examples are described below. In each example, chlorine gas was used as the halogen-containing gas, and helium gas was used as the inert gas, the length of the core rod 110 was L, and the chlorine concentration in the furnace core tube 24 before the P point reached the Q point was $C_0$ to obtain the results of the implementation. FIG. 8 summarizes the results of the implementation.

Example 1

The P point was determined so that the distance H from the O point was 0.08 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.48 $C_0$. The opaque glass portion 201 was not formed near the O point, and the transmission loss of the optical fiber obtained by spinning this portion was 0.28 dB/km at the wavelength of 1383 nm. The outer diameter of this portion was 153 mm.

Example 2

The P point was determined so that the distance H from the O point was 0.17 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.43 $C_0$. The opaque glass portion 201 was not formed near the O point, and the transmission loss of the optical fiber obtained by spinning this portion was 0.28 dB/km at a wavelength of 1383 nm. The outer diameter of this portion was 156 mm.

Example 3

The P point was determined so that the distance H from the O point was 0.20 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.37 $C_0$. The opaque glass portion 201 was not formed near the O point, and the transmission loss of the optical fiber obtained by spinning this portion was 0.29 dB/km at the wavelength of 1383 nm. The outer diameter of this portion was 161 mm.

8

Example 4

The P point was determined so that the distance H from the O point was 0.26 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.26 $C_0$. The opaque glass portion 201 was not formed near the O point, and the transmission loss of the optical fiber obtained by spinning this portion was 0.30 dB/km at the wavelength of 1383 nm. The outer diameter of this portion was 163 mm.

Comparative Example 1

The sintering was completed without decreasing the volume flow rate of chlorine gas to obtain the glass base material 200 for optical fiber. The opaque glass portion 201 was formed near the O point. The transmission loss of the optical fiber obtained by spinning this portion was 0.28 dB/km at the wavelength of 1383 nm. The outer diameter of this portion was 145 mm.

Comparative Example 2

The P point was determined so that the distance H from the O point was 0.03 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.87 $C_0$. The opaque glass portion 201 was formed near the O point. The transmission loss of the optical fiber obtained by spinning this portion was 0.28 dB/km at the wavelength of 1383 nm. The outer diameter of this portion was 147 mm.

Comparative Example 3

The P point was determined so that the distance H from the O point was 0.39 L, and the volume flow rate of chlorine gas was reduced to 0 immediately after the P point passed the Q point to obtain the glass base material 200 for optical fiber. The chlorine concentration in the furnace core tube 24 immediately after the O point passed the Q point was 0.15 $C_0$. The opaque glass portion 201 was formed near the O point. The transmission loss of the optical fiber obtained by spinning this portion was 0.34 dB/km at the wavelength of 1383 nm. The outer diameter of this portion was 167 mm.

From each of the above results, the following were confirmed.

When the distance H from the O point is shorter than 0.05 L, the amount of chlorine in the glass near the O point does not decrease, and the opaque glass portion is formed. In addition, this portion is easily elongated, and the outer diameter is narrower.

When the distance H from the O point is longer than 0.30 L, the amount of chlorine in the glass near the O point decreases, and transparent glass is formed, and the outer diameter is less likely to elongate. However, the degree of decrease in chlorine concentration is large enough to prevent sufficient dehydration near the O point, resulting in a transmission loss at the wavelength of 1383 nm higher than 0.31 dB/km.

On the other hand, if the distance H from the O point is determined so that $0.05 \times L \le H \le 0.30$ L and the glass base material 200 for optical fiber is manufactured under the condition that $C_1$ satisfies $0.25 \times C_0 \le C1 \le 0.5 \times C_0$, the optical fiber obtained by spinning the part near the 0 point has a transmission loss at the wavelength of 1383 nm of 0.31 dB/km or less, and the properties required for the product are achieved.

The present invention is not limited to the above embodiments. The above embodiments are examples, and any embodiment that has substantially the same configuration as the technical concept described in the claims of the present invention and achieves similar effects is included in the technical scope of the present invention. In other words, changes can be made as appropriate within the scope of the technical concept expressed in the present invention, and forms with such changes and improvements are included in the technical scope of the present invention.

REFERENCE SIGNS LIST

11 Rotating chuck
12 Burner
13 Burner stand
14 Flame
20 Sintering apparatus
21 Shaft
22 Carriage mechanism
23 Connecting member
24 Furnace core tube
25 Gas inlet port
26 Gas discharge port
30 Heating furnace
31 Heater
32 Heat-insulation material
33 Chamber
100 Porous base material for optical fiber
110 Core rod
120 Handle
130 Target rod
200 Glass base material for optical fiber
201 Opaque glass portion
H Distance
L Length

What is claimed is:

1. A manufacturing method of glass base material for optical fiber performing:

preparation of a porous base material for optical fiber in which a porous glass layer is formed around the periphery of a core rod;

sintering preparation, in which the porous base material for optical fiber is hung in a furnace core tube of a sintering apparatus; and sintering in which a mixture of halogen-containing gas and inert gas is constantly flowing into the furnace core tube, and the porous base material for optical fiber is made into transparent glass by heating the porous base material for optical fiber while moving a heater relative to the porous base material for optical fiber from one end of the core rod to an other end, to obtain the glass base material for optical fiber, wherein, in the process of moving the heater relative to the porous base material for optical fiber in the sintering, the concentration of halogen-containing gas in the mixed gas is reduced, and wherein a concentration of the halogen-containing gas at a start of an execution of the sintering is $C_0$ and a concentration of the halogen-containing gas at a time when the other end of the core rod passes a vertical midpoint of the heater is $C_1$, and a relationship between $C_0$ and $C_1$ is $0.25 \times C_0 \le C_1 \le 0.5 \times C_0$.

2. The method of manufacturing glass base material for optical fiber according to claim 1, wherein a length of the core rod is L, and a distance from the other end of the core rod to a position on the core rod where the concentration of the halogen-containing gas begins to decrease is H, and a relationship between L and H is $0.05 \times L \le H \le 0.30$ L.

3. The method of manufacturing glass base material for optical fiber according to claim 1, wherein the one end of the core rod is a lower end of the core rod and the other end is an upper end of the core rod at a time the porous base material for optical fiber is hung.

4. The method of manufacturing glass base material for optical fiber according to claim 1, wherein the heating temperature by the heater is 1400 to 1650° C.

5. The method of manufacturing glass base material for optical fiber according to claim 1, wherein the halogen-containing gas is chlorine or silicon tetrachloride.

6. The method of manufacturing glass base material for optical fiber according to claim 1, wherein the inert gas is helium, nitrogen or argon.

* * * * *